United States Patent
Wang et al.

(10) Patent No.: US 9,634,317 B2
(45) Date of Patent: Apr. 25, 2017

(54) REACTIVE SEPARATOR FOR A METAL-ION BATTERY

(71) Applicant: Sharp Laboratories of America, Inc., Camas, WA (US)

(72) Inventors: Long Wang, Vancouver, WA (US); Yuhao Lu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 641 days.

(21) Appl. No.: 14/230,882

(22) Filed: Mar. 31, 2014

(65) Prior Publication Data
US 2014/0205883 A1    Jul. 24, 2014

Related U.S. Application Data

(63) Continuation-in-part of application No. 14/198,755, filed on Mar. 6, 2014, which is a continuation-in-part
(Continued)

(51) Int. Cl.
*H01M 4/50* (2010.01)
*H01M 4/136* (2010.01)
(Continued)

(52) U.S. Cl.
CPC .............. *H01M 4/136* (2013.01); *C01B 17/02* (2013.01); *C01B 19/02* (2013.01); *C01B 25/003* (2013.01); *C01B 31/00* (2013.01); *C01B 33/021* (2013.01); *C01C 3/12* (2013.01); *C01D 1/02* (2013.01); *C01D 15/02* (2013.01); *H01M 2/14* (2013.01);
(Continued)

(58) Field of Classification Search
CPC ........ H01M 4/58; H01M 4/04; H01M 4/5825; H01M 2/1653; H01M 2/1686; H01M 4/628; H01M 4/134; H01M 4/1395; Y10T 29/49108; H02J 7/0042
See application file for complete search history.

(56) References Cited

U.S. PATENT DOCUMENTS 5,427,872 A    6/1995    Shen et al.
2008/0090138 A1*    4/2008    Vu ........................ H01M 2/16
                                                                    429/129
(Continued)

*Primary Examiner* — Emily Le
*Assistant Examiner* — Monique Wills
(74) *Attorney, Agent, or Firm* — Law Office of Gerald Maliszewski; Gerald Maliszewski

(57) ABSTRACT

A reactive separator is provided for a metal-ion battery. The reactive separator is made up of a reactive layer that is chemically reactive to alkali or alkaline earth metals, and has a first side and a second side. A first non-reactive layer, chemically non-reactive with alkali or alkaline earth metals, is adjacent to the reactive layer first side. A second non-reactive layer, also chemically non-reactive with alkali or alkaline earth metals, is adjacent to the reactive layer second side. More explicitly, the first and second non-reactive layers are defined as having less than 5 percent by weight (wt %) of materials able to participate in electrochemical reactions with alkali or alkaline earth metals. The reactive layer may be formed as a porous membrane embedded with reactive components, where the porous membrane is carbon or a porous polymer. Alternatively, the reactive layer is formed as a polymer gel embedded with reactive components.

12 Claims, 6 Drawing Sheets

Related U.S. Application Data of application No. 14/198,702, filed on Mar. 6, 2014, which is a continuation-in-part of application No. 14/198,663, filed on Mar. 6, 2014, now Pat. No. 9,537,131, which is a continuation-in-part of application No. 14/193,782, filed on Feb. 28, 2014, which is a continuation-in-part of application No. 14/193,501, filed on Feb. 28, 2014, now Pat. No. 9,406,919, which is a continuation-in-part of application No. 14/174,171, filed on Feb. 6, 2014, now Pat. No. 9,455,431, which is a continuation-in-part of application No. 14/067,038, filed on Oct. 30, 2013, now Pat. No. 9,450,224, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(51) Int. Cl.

| | |
|---|---|
| *H01M 4/58* | (2010.01) |
| *C01C 3/12* | (2006.01) |
| *H01M 4/04* | (2006.01) |
| *H01M 4/62* | (2006.01) |
| *H02J 7/00* | (2006.01) |
| *H01M 4/134* | (2010.01) |
| *H01M 4/1395* | (2010.01) |
| *C01B 17/02* | (2006.01) |
| *C01B 19/02* | (2006.01) |
| *C01B 25/00* | (2006.01) |
| *C01B 31/00* | (2006.01) |
| *C01B 33/021* | (2006.01) |
| *C01D 1/02* | (2006.01) |
| *C01D 15/02* | (2006.01) |
| *H01M 4/131* | (2010.01) |
| *H01M 4/133* | (2010.01) |
| *H01M 4/1391* | (2010.01) |
| *H01M 4/38* | (2006.01) |
| *H01M 4/485* | (2010.01) |
| *H01M 4/505* | (2010.01) |
| *H01M 4/56* | (2006.01) |
| *H01M 4/587* | (2010.01) |
| *H01M 10/054* | (2010.01) |
| *H01M 10/0525* | (2010.01) |
| *H01M 10/0565* | (2010.01) |
| *H01M 2/16* | (2006.01) |
| *H01M 4/1397* | (2010.01) |
| *H01M 2/14* | (2006.01) |
| *H01M 10/056* | (2010.01) |
| *H01M 10/052* | (2010.01) |

(52) U.S. Cl.
CPC ....... *H01M 2/1653* (2013.01); *H01M 2/1686* (2013.01); *H01M 4/04* (2013.01); *H01M 4/0404* (2013.01); *H01M 4/049* (2013.01); *H01M 4/0416* (2013.01); *H01M 4/0452* (2013.01); *H01M 4/0471* (2013.01); *H01M 4/0495* (2013.01); *H01M 4/0497* (2013.01); *H01M 4/131* (2013.01); *H01M 4/133* (2013.01); *H01M 4/134* (2013.01); *H01M 4/1391* (2013.01); *H01M 4/1395* (2013.01); *H01M 4/1397* (2013.01); *H01M 4/38* (2013.01); *H01M 4/381* (2013.01); *H01M 4/382* (2013.01); *H01M 4/387* (2013.01); *H01M 4/485* (2013.01); *H01M 4/505* (2013.01); *H01M 4/56* (2013.01); *H01M 4/58* (2013.01); *H01M 4/587* (2013.01); *H01M 4/5825* (2013.01); *H01M 4/628* (2013.01); *H01M 10/054* (2013.01); *H01M 10/056* (2013.01); *H01M 10/0525* (2013.01); *H01M 10/0565* (2013.01); *H02J 7/0042* (2013.01); *H01M 10/052* (2013.01); *Y02E 60/122* (2013.01); *Y10T 29/49108* (2015.01)

(56) References Cited

U.S. PATENT DOCUMENTS

2013/0128488 A1\* 5/2013 Forster .............. H01M 10/0436
    361/820
2013/0224632 A1\* 8/2013 Roumi .................. H01M 2/166
    429/516

\* cited by examiner

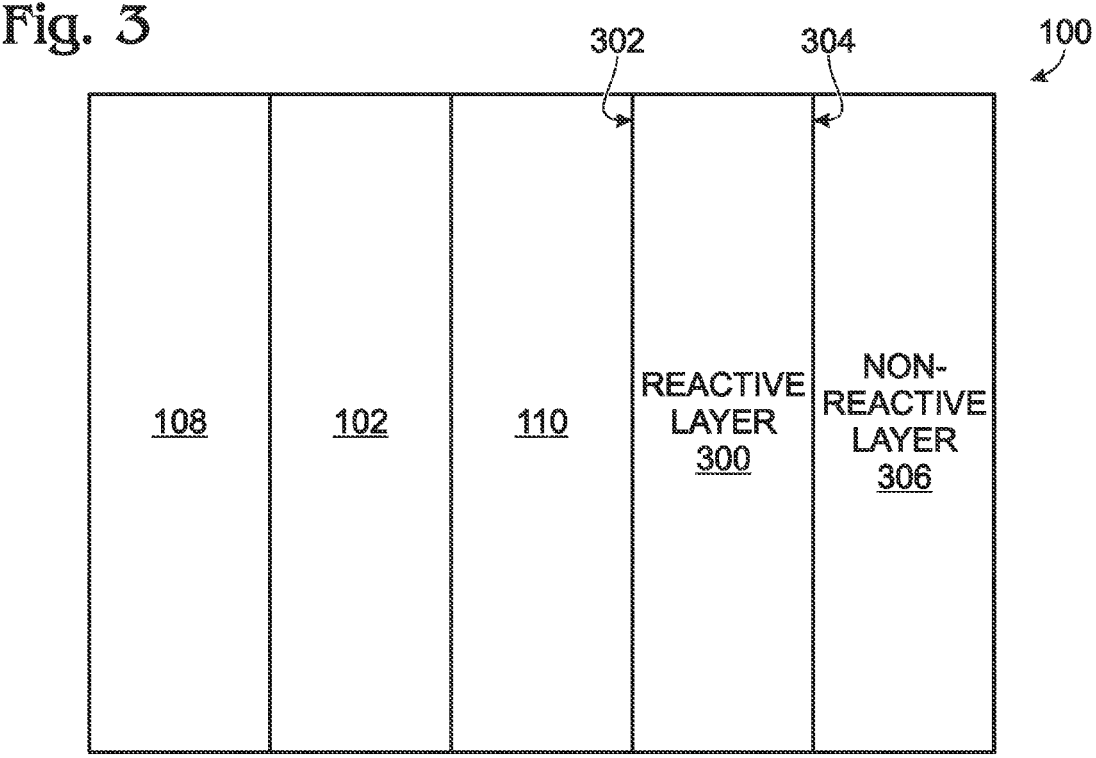
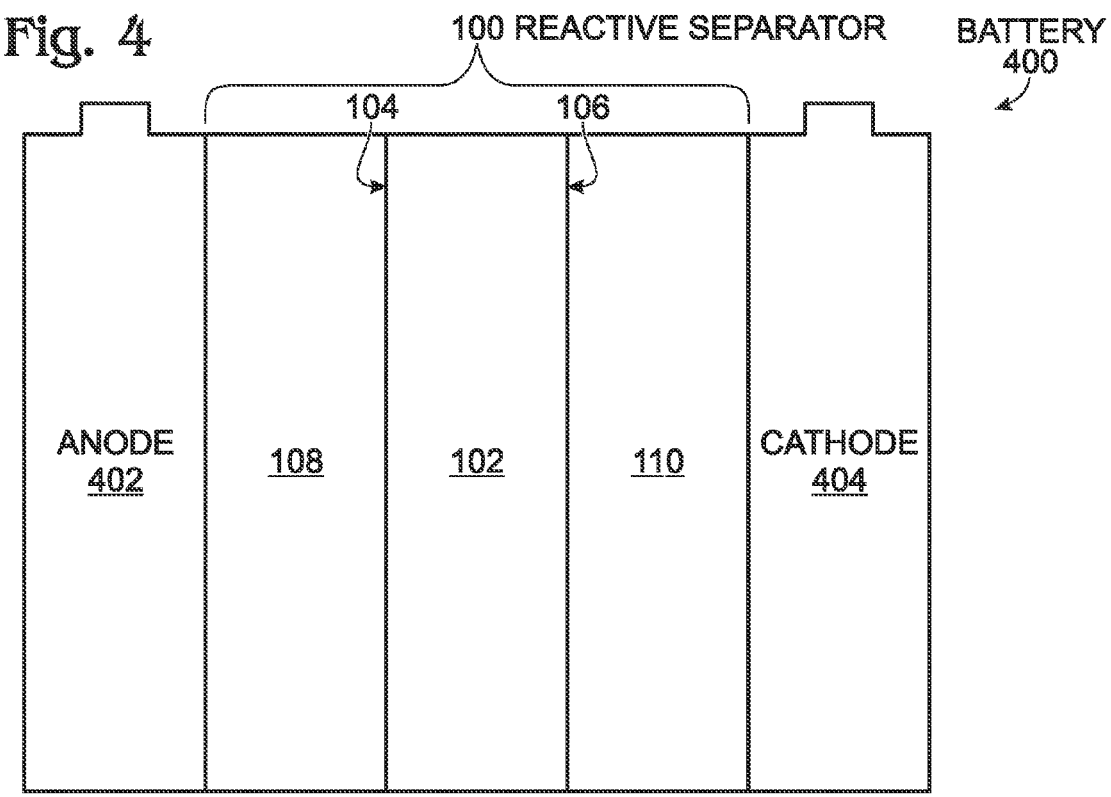

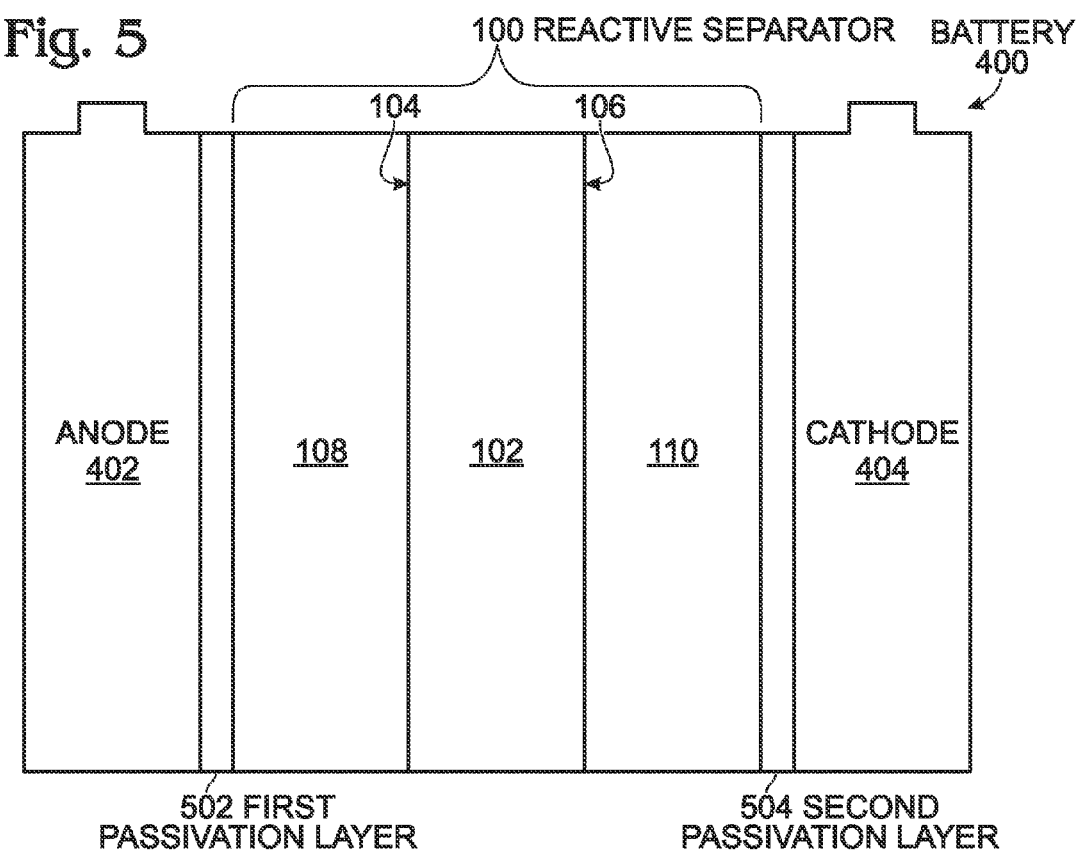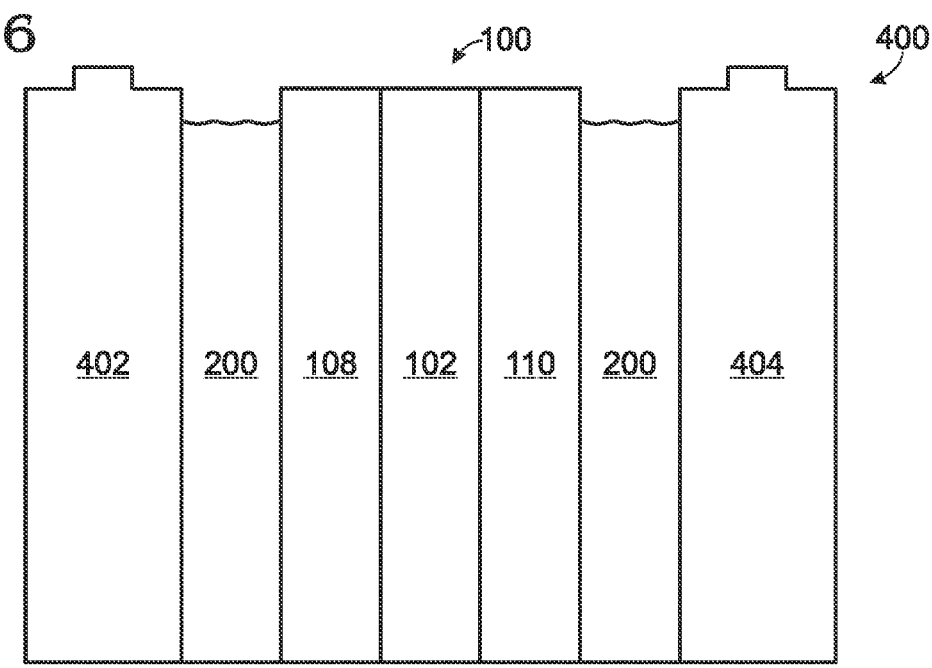

REACTIVE SEPARATOR FOR A METAL-ION BATTERY

RELATED APPLICATIONS

This application is a Continuation-in-Part of an application entitled, NASICON-POLYMER ELECTROLYTE STRUCTURE, invented by Long Wang et al, U.S. Ser. No. 14/198,755, filed Mar. 6, 2014;

which is a Continuation-in-Part of an application entitled, BATTERY WITH AN ANODE PRELOADED WITH CONSUMABLE METALS, invented by Yuhao Lu et al, U.S. Ser. No. 14/198,702, filed Mar. 6, 2014;

which is a Continuation-in-Part of an application entitled, BATTERY ANODE WITH PRELOADED METALS, invented by Long Wang et al, U.S. Ser. No. 14/198,663, filed Mar. 6, 2014;

which is a Continuation-in-Part of an application entitled, METAL BATTERY ELECTRODE WITH PYROLYZED COATING, invented by Yuhao Lu et al, U.S. Ser. No. 14/193,782, filed Feb. 28, 2014;

which is a Continuation-in-Part of an application entitled, METAL HEXACYANOMETALLATE ELECTRODE WITH SHIELD STRUCTURE, invented by Yuhao Lu et al, U.S. Ser. No. 14/193,501, filed Feb. 28, 2014;

which is a Continuation-in-Part of an application entitled, CYANOMETALLATE CATHODE BATTERY AND METHOD FOR FABRICATION, invented by Yuhao Lu et al, U.S. Ser. No. 14/174,171, filed Feb. 6, 2014;

This application is a Continuation-in-Part of an application entitled, SODIUM IRON(II)-HEXACYANOFERRATE(II) BATTERY ELECTRODE AND SYNTHESIS METHOD, invented by Yuhao Lu et al, U.S. Ser. No. 14/067,038, filed Oct. 30, 2013;

which is a Continuation-in-Part of an application entitled, TRANSITION METAL HEXACYANOMETALLATE-CONDUCTIVE POLYMER COMPOSITE, invented by Sean Vail et al., U.S. Ser. No. 14/059,599, filed Oct. 22, 2013;

which is a Continuation-in-Part of an application entitled, METAL-DOPED TRANSITION METAL HEXACYANOFERRATE (TMHCF) BATTERY ELECTRODE, invented by Yuhao Lu et al., U.S. Ser. No. 13/907,892, filed Jun. 1, 2013;

which is a Continuation-in-Part of an application entitled, HEXACYANOFERRATE BATTERY ELECTRODE MODIFIED WITH FERROCYANIDES OR FERRICYANIDES, invented by Yuhao Lu et al., U.S. Ser. No. 13/897,492, filed May 20, 2013;

which is a Continuation-in-Part of an application entitled, PROTECTED TRANSITION METAL HENACYANOFERRATE BATTERY ELECTRODE, invented by Yuhao Lu et al., U.S. Ser. No. 13/872,673, filed Apr. 29, 2013;

which is a Continuation-in-Part of an application entitled, TRANSITION METAL HENACYANOFERRATE BATTERY CATHODE WITH SINGLE PLATEAU CHARGE/DISCHARGE CURVE, invented by Yuhao Lu et al., U.S. Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., U.S. Ser. No. 13/603,322, filed Sep. 4, 2012.

U.S. Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., U.S. Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., U.S. Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., U.S. Ser. No. 13/432,993, filed Mar. 28, 2012. All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical cells and, more particularly, to a reactive separator to prevent the formation of metal dendrites in metal-ion batteries.

2. Description of the Related Art

Lithium-ion batteries (LIBs) are widely used in a vast number of applications such as power sources for electronic devices, electric vehicles, and energy storage devices for wind and solar power. However, one of the major safety issues for LIBs is lithium plating and dendrite formation during the charge process. Although graphite is used as a non-lithium-metal anode in state-of-the-art LIBs, lithium plating can still occur when the battery is subjected to abuse such as fast-charging, low-temperature environments, and overcharging.

Lithium plating results in the formation of lithium dendrites that penetrate through the porous separator and short the battery. Serious consequences such as fire and explosions can be caused by such lithium dendrite formation and growth. Dendrite formation is worse when a lithium metal anode is used in the battery. However, the substitution of lithium metal for graphite is desirable in light of the resulting increase in energy density of LIBs and in the development of batteries beyond LIBs, such as lithium-sulfur and lithium-air batteries.

Other alkali and alkaline earth metal-ion batteries, especially the rechargeable sodium-ion battery (SIB), have attracted a lot of research attention because of their low-cost and comparable energy density as compared to LIBs. Unlike LIBs, graphite is incapable of sodium accommodation in a sodium battery. Hard carbon is considered to be the most likely non-sodium-metal anode for SIBS in the foreseeable future. However, the potential for sodium intercalation into hard carbon is mainly below 100 millivolts (mV) and the sodium diffusion is slow between different sites in a hard carbon anode. These characteristics lead to the hazard of sodium dendrites when hard carbon is used in a SIB. Since the ionic radius becomes larger and larger in the elements of lithium to sodium, potassium, and cesium, and since few non-metal anodes have been reported for these metal-ion batteries, it is reasonable to conclude that the dendrite issue will remain as a major obstacle in the development of novel rechargeable metal-ion batteries.

In order to prevent metal dendrite growth/penetration, several strategies have been developed in the past decades. Electrolyte additives are proven to be helpful to form a uniform solid electrolyte interface (SEI) layer on the anode surface, which is beneficial both to suppressing electrolyte decomposition and dendrite growth, but no reported additive can eliminate dendrite growth completely. A dense solid state electrolyte membrane, which can be either ceramic or polymer, is considered to be the most efficient dendrite penetration blocker, but the low conductivity and high fabrication cost of these membranes prevent their large-scale application. Gel-like polymer electrolytes without inorganic fillers have also demonstrated the ability to block dendrite growth at certain level, but the instability of these electrolytes at the anode electrode surface and the unstable structure of the gel-electrolyte remain as unsolved problems for practical applications.

It would be advantageous if a structure existed that would react with lithium, sodium, or any other alkali and alkaline (earth) metal dendrite and therefore protect a battery from an internal short circuit, enabling a battery to achieve ultra-long cycle life with improved safety.

SUMMARY OF THE INVENTION

Different from all of the aforementioned strategies, a separator is disclosed herein that is made up of a reactive layer that can react with lithium, sodium, or any other alkali and alkaline (earth) metal dendrite, to protect a battery from an internal short circuit. Although a reactive polymer separator containing a polytetrafluoroethylene layer was proposed in the 1990s for the prevention of dendrites in lithium-ion batteries (LIBs), the reaction between lithium and polytetrafluoroethylene is quite slow and therefore it cannot protect the cell from an internal short in most circumstance. Herein, a sandwich structure separator is described that includes a layer of reactive chemical agent, such as hexacyanometallate, that reacts with metal dendrite tips faster than polytetrafluoroethylene and, therefore, enables the battery to achieve ultra-long cycle life with improved safety.

In one aspect, a sandwich structure separator includes two layers of non-reactive layers respectively adjacent to the cathode and anode, and one reactive layer between the non-reactive layers that chemically reacts with alkali or alkaline earth metals. The reactive layer may include organic or inorganic components that react with metal dendrites, such as lithium, sodium, potassium and cesium, which might otherwise form and grow on the anode. The metal dendrites are either consumed or passivated locally within the reactive layer so that they do not reach the cathode, protecting the battery from shorting by dendrite penetration.

The multi-layered separator can be either a porous solid membrane or a gel-like polymer that contains reactive components, such as (but not limited to) benzoquinone, ferrocene derivates, metal ferricyanides/ferrocyanides, tetrathiafulvalene derivates, sulfides, metal hexacyanoferrate, and polyvinylpyrrolidone. These materials react with alkali or alkaline earth metal dendrites in the temperature range between −30 and 180° C. The non-reactive layers can be porous polymer or ceramic membranes, or gel-like polymer layers that are inactive, or they can be passivated at the interface to adjacent cathode or anode electrodes. The separator is itself ionically conductive, or is permeable to an ionic conductive electrolyte. The reactive layer can be either electronically conductive or insulating.

Accordingly, a reactive separator is provided for a metal-ion battery. As noted above, the reactive separator is made up of a reactive layer that is chemically reactive to alkali or alkaline earth metals, and has a first side and a second side. A first non-reactive layer, chemically non-reactive with alkali or alkaline earth metals, is adjacent to the reactive layer first side. A second non-reactive layer, also chemically non-reactive with alkali or alkaline earth metals, is adjacent to the reactive layer second side. More explicitly, the first and second non-reactive layers are defined as having less than 5 percent by weight (wt %) of materials able to participate in electrochemical reactions with alkali or alkaline earth metals.

The reactive layer may be formed as a porous membrane embedded with the above-mentioned reactive components, where the porous membrane is carbon or a porous polymer. Alternatively, the reactive layer is formed as a polymer gel embedded with reactive components. The first and second non-reactive layers may be a porous polymer, ceramic membrane, or polymer gel. The reactive and non-reactive layers may be made with the same material. In one aspect, the reactive separator includes a liquid electrolyte, and the combination of the first non-reactive layer, reactive layer, and second non-reactive layer is permeable to the liquid electrolyte. In another aspect, the reactive separator includes a plurality reactive layers and/or a plurality of non-reactive layers (more than two).

Additional details of the above-described reactive separator and a battery made using a reactive separator are presented below.

BRIEF DESCRIPTION OF THE DRAWINGS

FIG. 3 is a partial cross-sectional view of a second variation of the reactive separator of FIG. 1.

FIG. 4 is a partial cross-sectional view of a metal-ion battery with a reactive separator.

FIG. 5 is a partial cross-sectional view of a first variation of the metal-ion battery with reactive separator.

FIG. 6 is a partial cross-sectional view of a second variation of the metal-ion battery using the reactive separator described by FIG. 2.

DETAILED DESCRIPTION

Figure 1:
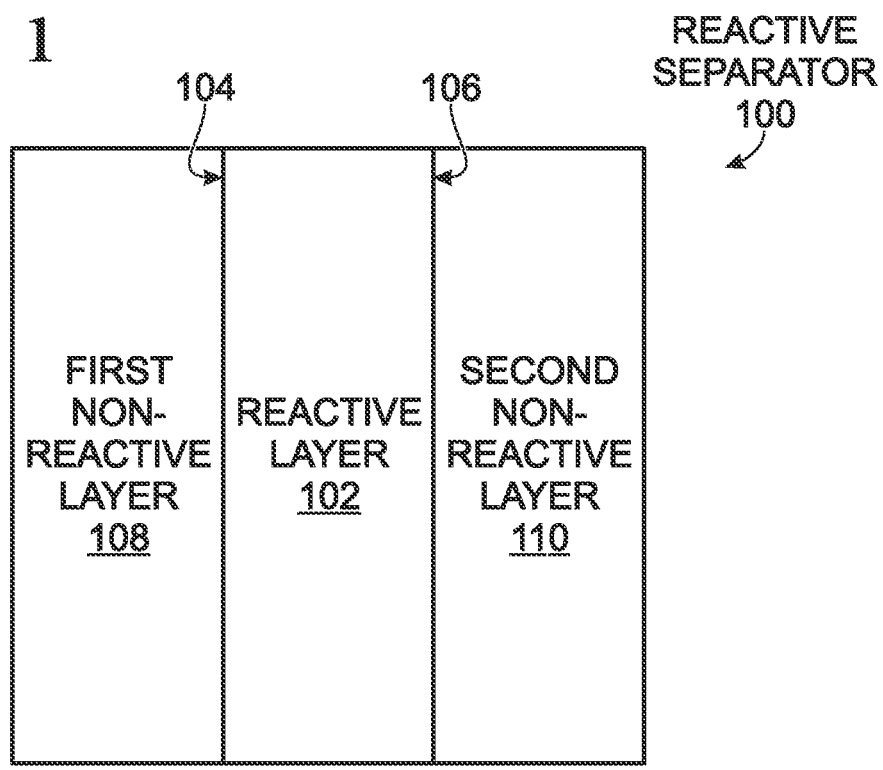
FIG. 1 is a partial cross-sectional view of a reactive separator for a metal-ion battery.

FIG. 1 is a partial cross-sectional view of a reactive separator for a metal-ion battery. The reactive separator 100 comprises a reactive layer 102 that is chemically reactive to a first group of metals that includes alkali and alkaline earth metals. The reactive layer 102 has a first side 104 and a second side 106. The reactive separator further comprises a first non-reactive layer 108 that is chemically non-reactive with metals from the first group. The first non-reactive layer 108 is located adjacent to the reactive layer first side 104. A second non-reactive layer 110, which is likewise chemically non-reactive with metals from the first group, is located adjacent the reactive layer second side 106. The first non-reactive layer 108 and second non-reactive layer 110 are defined herein as having less than 5 percent by weight (wt %) of materials able to participate in electrochemical reactions with members of the first group.

In one aspect, the reactive layer 102 is formed as a porous membrane embedded with reactive components, where the porous membrane is either carbon or a porous polymer. The polymer may be poly(ethylene oxide) (PEO), poly(acrylonitrile) (PAN), poly(methyl metacrylate) (PMMA), polyvinyl chloride) (PVC), poly(vinylidene fluoride) (PVdF), poly (vinylidene fluoride-co-hexafluoropropylene) (PVdF-HIT), poly(tetrafluoroethylene) (PTFE), poly(vinyl acetate) (PVAc), polyvinyl alcohol) (PVA), poly(styrene) (PS), poly (p-pheneylene oxide) (PPO), poly(ethylene terephthalate) (PET), polyvinyl pyrrolidinone) (PVP), poly (vinyl butyral) (PVB), polyethylene (PE), polypropylene (PP), poly(imides)s (PIs), or poly(urethane)s (PUs). However, this is not an exhaustive list of all enabling porous polymer materials.

Alternatively, the reactive layer 102 is formed as a polymer gel embedded with reactive components. The polymer gel may be poly(ethylene oxide) (PEO), poly(acrylonitrile) (PAN), poly(vinylidene fluoride) (PVDF), or poly(methyl methacrylate) (PMMA). However, this is not an exhaustive list of all enabling polymer gels.

The reactive layer 102 includes embedded reactive components such as benzoquinone, ferrocene derivates, metal ferricyanides, metal ferrocyanides, tetrathiafulvalene derivates, sulfides, metal hexacyanoferrate, or polyvinylpyrrolidone. However, this is not an exhaustive list of all enabling reactive materials. Embedded with such reactive components, the reactive layer 102 is chemically reactive with metals such as lithium (Li), sodium (Na), potassium (K), rubidium (Rb), cesium (Cs), calcium (Ca), strontium (Sr), barium (Ba), zinc (Zn), aluminum (Al), and magnesium (Mg).

The first 108 and second non-reactive layers 110 may be a porous polymer, ceramic membrane, or polymer gel. Some examples of suitable porous polymer materials include polypropylene (PP) and polyethylene (PE), and cellulose. Some examples of ceramic membrane materials include alumina, zirconium dioxide, $Al_2O_3$—$P_2O_5$—$TiO_2$ glass ceramic, $Na_3Zr_2PO_4(SiO_4)_2$, $Na_3PS_4$, and $Na_2S$—$P_2S_5$ glass ceramic. Again, the above-mentioned examples are not an exhaustive list of all possible materials.

Typically, the reactive layer 102 includes a first material having an electrical conductivity in a range between $1\times10^{-14}$ and $1\times10^8$ Siemens per centimeter (S/cm), with reactive components embedded in the first material. The first 108 and second non-reactive layers 110 each typically have an electrical conductivity of less than $1\times10^{-1}$ S/cm. In other words, the reactive layer 102 is electrically conductive while the non-reactive layers 108 and 110 and not electrically conductive. In one aspect, the first 108 and second non-reactive layers 110 are made from the first material, with the difference being that the reactive layer additionally includes reactive components.

The reactive layer 102 typically has an ionic conductivity of greater than $1\times10^{-7}$ S/cm at 25° C., while the first 108 and second non-reactive layers 110 each have an ionic conductivity of less than $1\times10^{-1}$ S/cm. Electrical conductivity refers to electrons as charge carriers, while ionic conductivity refers to ions as charge carriers. Overall, the reactive separator 100 has an ionic conductivity of greater than $1\times10^{-7}$ S/cm at 25° C.

Figure 2:
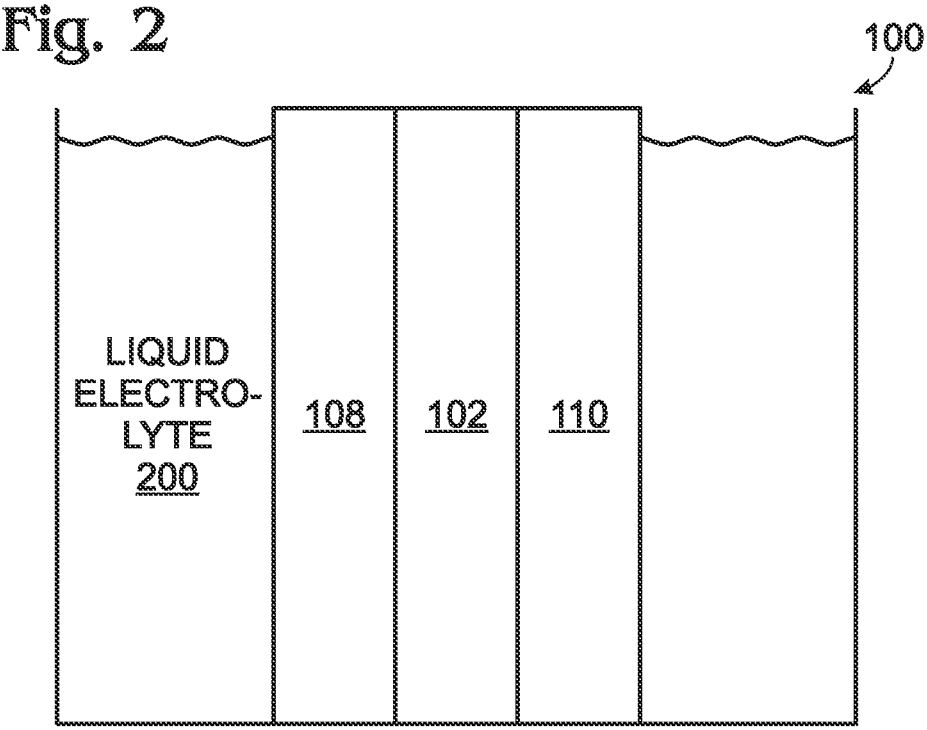
FIG. 2 is a partial cross-sectional view of a first variation of the reactive separator of FIG. 1.

FIG. 2 is a partial cross-sectional view of a first variation of the reactive separator of FIG. 1. In this aspect, the reactive separator 100 further comprises a liquid electrolyte 200. The combination of the first non-reactive layer 108, reactive layer 102, and second non-reactive layer 110 is permeable to the liquid electrolyte 200 in a ratio greater than 10 wt % liquid electrolyte, as compared to the combined weight of the first non-reactive layer, reactive layer, and second non-reactive layer. The reactive separator 100 has an ionic conductivity of greater than $1\times10^{-7}$ S/cm at 25° C. Although not explicitly shown, the reactive separator of FIG. 2 may be formed with a plurality of reactive layers or more than two non-reactive layers (see FIG. 3).

FIG. 3 is a partial cross-sectional view of a second variation of the reactive separator of FIG. 1. In this aspect, the reactive separator 100 further comprises more than two non-reactive layers, and a plurality reactive layers, such that each reactive layer has a first side adjacent a non-reactive layer and a second side adjacent a non-reactive layer. Explicitly shown is a reactive separator with an additional reactive layer 300 having a first side 302 and a second side 304, and an additional non-reactive layer 306. However, it should be understood that the reactive separator is not limited to any particular number of reactive layers or non-reactive layers, as long as the two external surfaces of the reactive separator, to be placed adjacent to the anode and cathode in a battery, are non-reactive layers. Alternatively but not shown, a reactive layer may be sandwiched by multiple non-reactive layers on one or more sides of the reactive layer. In another variation not shown, non-reactive layers may sandwich a plurality of adjacent reactive layers.

FIG. 4 is a partial cross-sectional view of a metal-ion battery with a reactive separator. The battery 400 comprises an anode 402, a cathode 404, and a reactive separator 100. The reactive separator 100 is as described above in the explanation of FIGS. 1 through 3. As noted above, the reactive separator 100 may comprise a reactive layer 102, a first non-reactive layer 108 interposed between the anode 402 and the reactive layer first side 104, and a second non-reactive layer 110 interposed between the cathode 404 and the reactive layer second side 106. Less than 5 wt % of the non-reactive layers participate in chemical and electrochemical reactions during battery operation. Alternatively, the reaction depth of the non-reactive layers is less than 3 microns (μm). The reactive separator 100 typically has an ionic conductivity of greater than $1\times10^{-7}$ Siemens per centimeter (S/cm) at 25° C.

The cathode 404 may be materials such as metal hexacyanometallates (MHCMs), transition metal oxides, transition metal fluorides, and air (oxygen) electrodes. An air (oxygen) cathode is an electrode that uses air or oxygen gas as cathode material. Normally, an air cathode contains carbon and a catalyst for oxygen reduction and evolution reactions.

The anode 402 may be a material such as lithium (Li), sodium (Na), potassium (K), rubidium (Rb), cesium (Cs), calcium (Ca), strontium (Sr), zinc (Zn), aluminum (Al), magnesium (Mg), zinc (Zn), tin (Sn), germanium (Ge), antimony (Sb), or alloys including a material such as Sn, Ge, Sb, carbon materials, transition metal oxides, silicon (Si), and phosphorus (P). Although not explicitly shown, a polymeric binder such as polytetrafluoroethylene (PTFE) or polyvinylidene difluoride (PVDF) may be used to provide adhesion between electrode materials and current collectors to improve the overall physical stability of the anode and cathode.

FIG. 5 is a partial cross-sectional view of a first variation of the metal-ion battery with reactive separator. In this aspect, the battery 400 further comprises a first passivation layer 502 interposed between the first non-reactive layer 108 and the anode 402. A second passivation layer 504 is interposed between the second non-reactive layer 110 and the cathode 404. The passivation layers may be formed as a result of chemical reactions between the non-reactive layers, anode, and cathode, for example, during initial cycling of the battery. Although only one reactive layer is shown, the reactive separator is not limited to any particular number of reactive layers or only two non-reactive layers, as long as the surfaces of the reactive separator adjacent to the anode and cathode are non-reactive layers. Alternatively but not shown, a passivation layer may only be formed adjacent the anode or adjacent only the cathode.

FIG. 6 is a partial cross-sectional view of a second variation of the metal-ion battery using the reactive separator described by FIG. 2. In this aspect, the combination of the first non-reactive layer 108, reactive layer 102, and second non-reactive layer 110 is permeable to the liquid electrolyte 200 in a ratio greater than 10 wt % liquid electrolyte as compared to the combined weight of the first non-reactive layer, reactive layer, and second non-reactive layer. The reactive separator 100 typically has an ionic conductivity of greater than $1\times10^{-7}$ Siemens per centimeter (S/cm) at 25° C. Although only one reactive layer is shown, the reactive separator is not limited to any particular number of reactive layers, or only two non-reactive layers, as long as the surfaces of the reactive separator adjacent to the anode and cathode are non-reactive layers.

Figure 7:
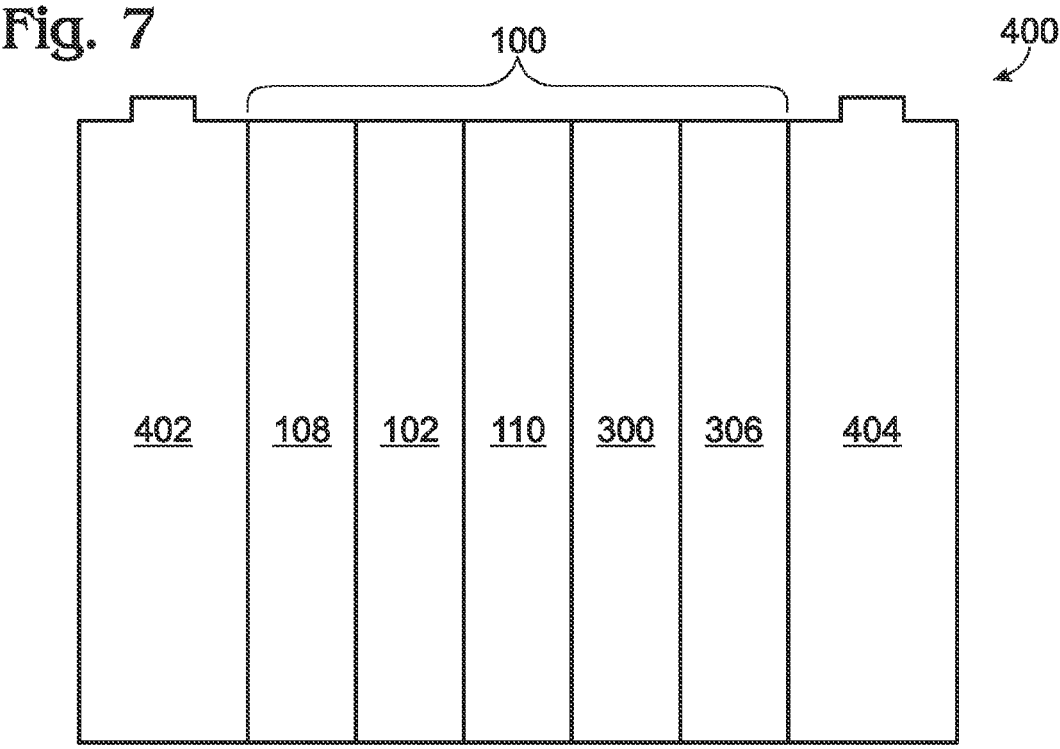
FIG. 7 is a partial cross-sectional view of a third variation of the metal-ion battery using the reactive separator described by FIG. 3.

FIG. 7 is a partial cross-sectional view of a third variation of the metal-ion battery using the reactive separator described by FIG. 3. Shown is a plurality reactive layers, including reactive layers 102 and 306, where each reactive layer has a first side adjacent a non-reactive layer and a second side adjacent a non-reactive layer. Again as noted above in the explanation of FIG. 3, although two reactive layers are shown, the reactive separator is not limited to any particular number of reactive layers or non-reactive layers, as long as the two external surfaces of the reactive separator, adjacent to the anode and cathode, are non-reactive layers.

Figure 8:
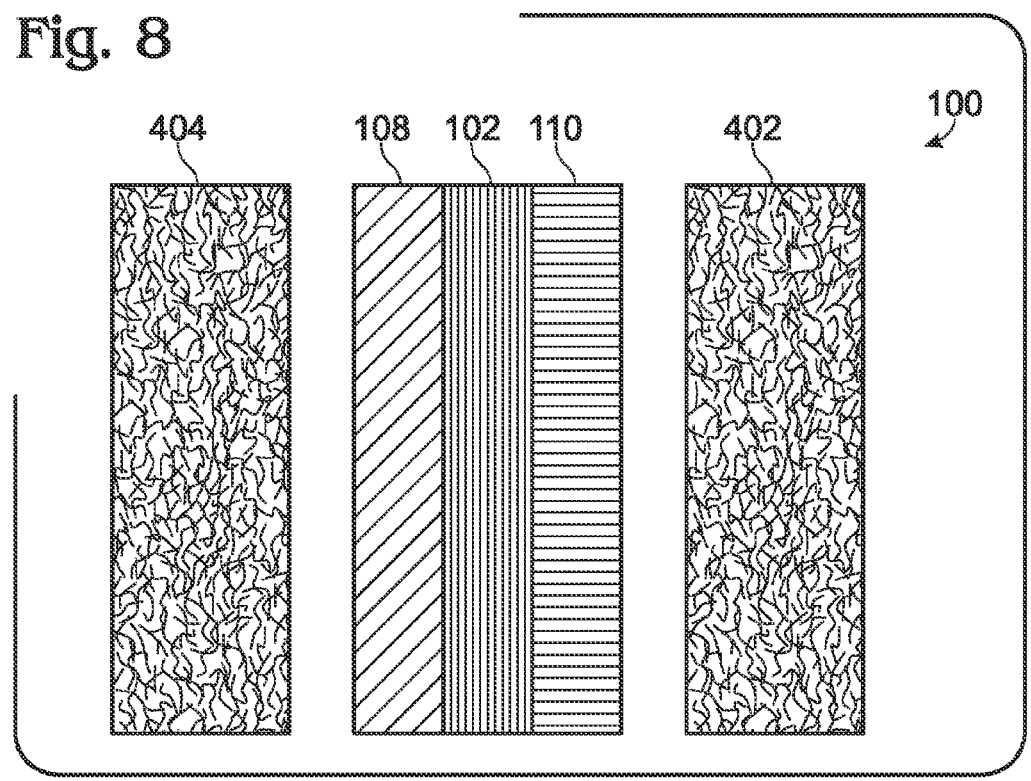
FIG. 8 is an alternate depiction of the reactive separator of FIG. 4.

FIG. 8 is an alternate depiction of the reactive separator of FIG. 4. The reactive separator may be seen as a sandwich structure separator that includes of two layers of non-reactive layers 108 and 110 that are respectively adjacent to the cathode 404 and anode 402, and also adjacent to reactive layer 102. The reactive layer 102 chemically reacts with alkali or alkaline earth metals. The reactive layer 102 may include reactive organic or inorganic components that react with metal dendrites of lithium, sodium, potassium, or cesium for example, that would otherwise form and grow on the anode 402. The metal dendrites are either consumed or passivated locally inside the reactive layer 102 and do not reach the cathode 404, so the battery is protected from shorting by dendrite penetration.

Dendrite formation and growth have proven to be a major safety issue that may cause fire and explosion hazards in LIB applications. Similar sever phenomena have been observed in other metal-ion batteries, such as sodium-ion and potassium-ion batteries (SIBs and PIBs). However, the above-described sandwich structured separator/electrolyte, with a reactive layer, reacts with alkali or alkaline earth metal dendrites to protect the batteries from internal short circuits, active material loss, and thermal run-away. A specific example based on rechargeable sodium-ion battery with a sodium metal anode is given below to illustrate the mechanism for dendrite elimination.

Figure 9:
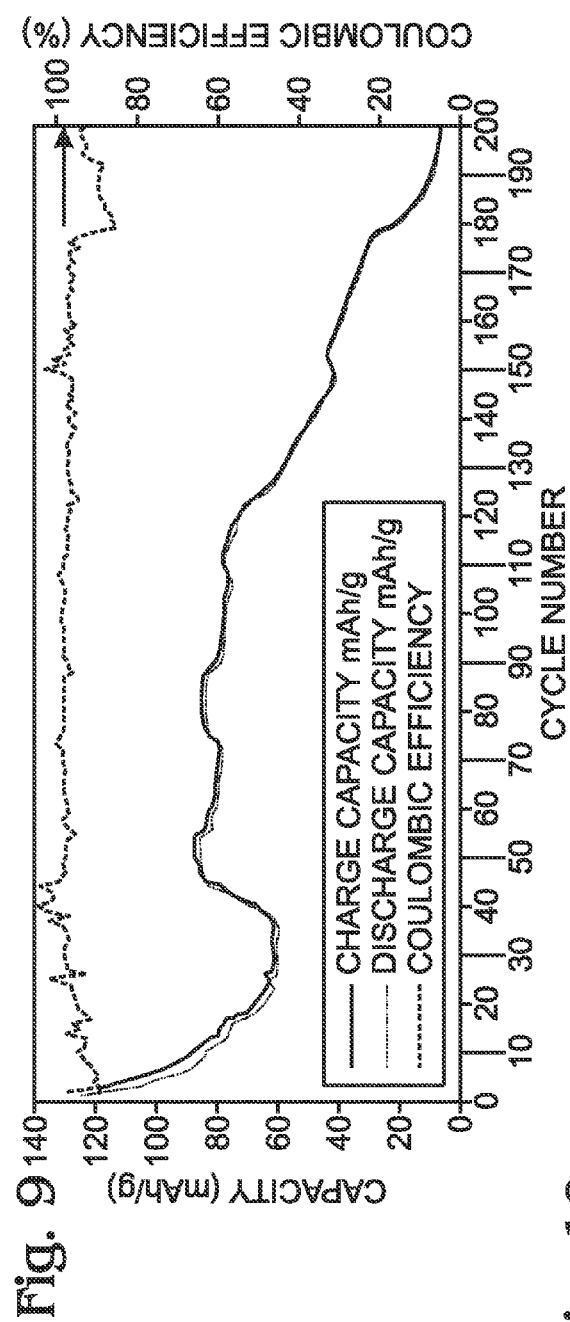
FIG. 9 is a graph depicting the capacity retention of a conventional half-cell with a Prussian blue analogue (PBA) cathode, a layer of Celgard separator, and a sodium metal anode.

FIG. 9 is a graph depicting the capacity retention of a conventional half-cell with a Prussian blue analogue (PBA) cathode, a layer of Celgard separator, and a sodium metal anode. Because of sodium dendrite formation, which further results in cathode material degradation, the battery capacity fades rapidly and has almost no capacity left after 200 cycles. Low coulombic efficiency is also observed during cycling because the sodium dendrite reaches, and becomes oxidized at the cathode.

Figure 10:
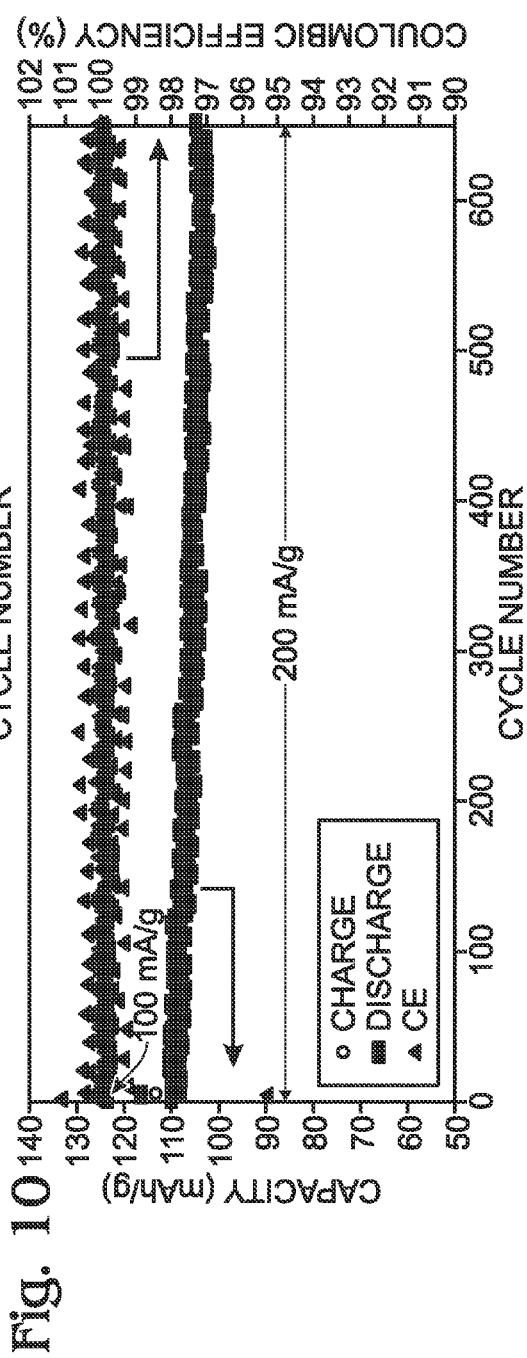
FIG. 10 is a graph depicting cycling performance of a PBA/Na battery with a $KNiFe(CN)_6$-carbon-PTFE reactive layer in a sandwich structured separator.

FIG. 10 is a graph depicting cycling performance of a PBA/Na battery with a $KNiFe(CN)_6$-carbon-PTFE reactive layer in a sandwich structured separator. In contrast to the conventional structure of FIG. 9, when a sandwich structured separator containing a reactive layer is placed between the cathode and anode, the battery shows excellent long term cyclability. A thin film containing 70% $KNiFe(CN)_6$ nanoparticles, 20% carbon black, and 10% PTFE (the reactive layer) was placed between two Celgard separator layers (the non-reactive layers) to form a reactive sandwich structured separator to replace the single layer separator used in the battery of FIG. 9. $KNiFe(CN)_6$ can react with sodium dendrites at room temperature, and therefore efficiently prevent sodium dendrite/particles from reaching the cathode. The battery maintains 95% of its initial reversible capacity after 650 cycles at a high current density of 1.3 C (1 C=150 milliamp hours per gram (mAh/g)). The battery also exhibits improved coulombic efficiency that is higher than 99%.

Figure 11:
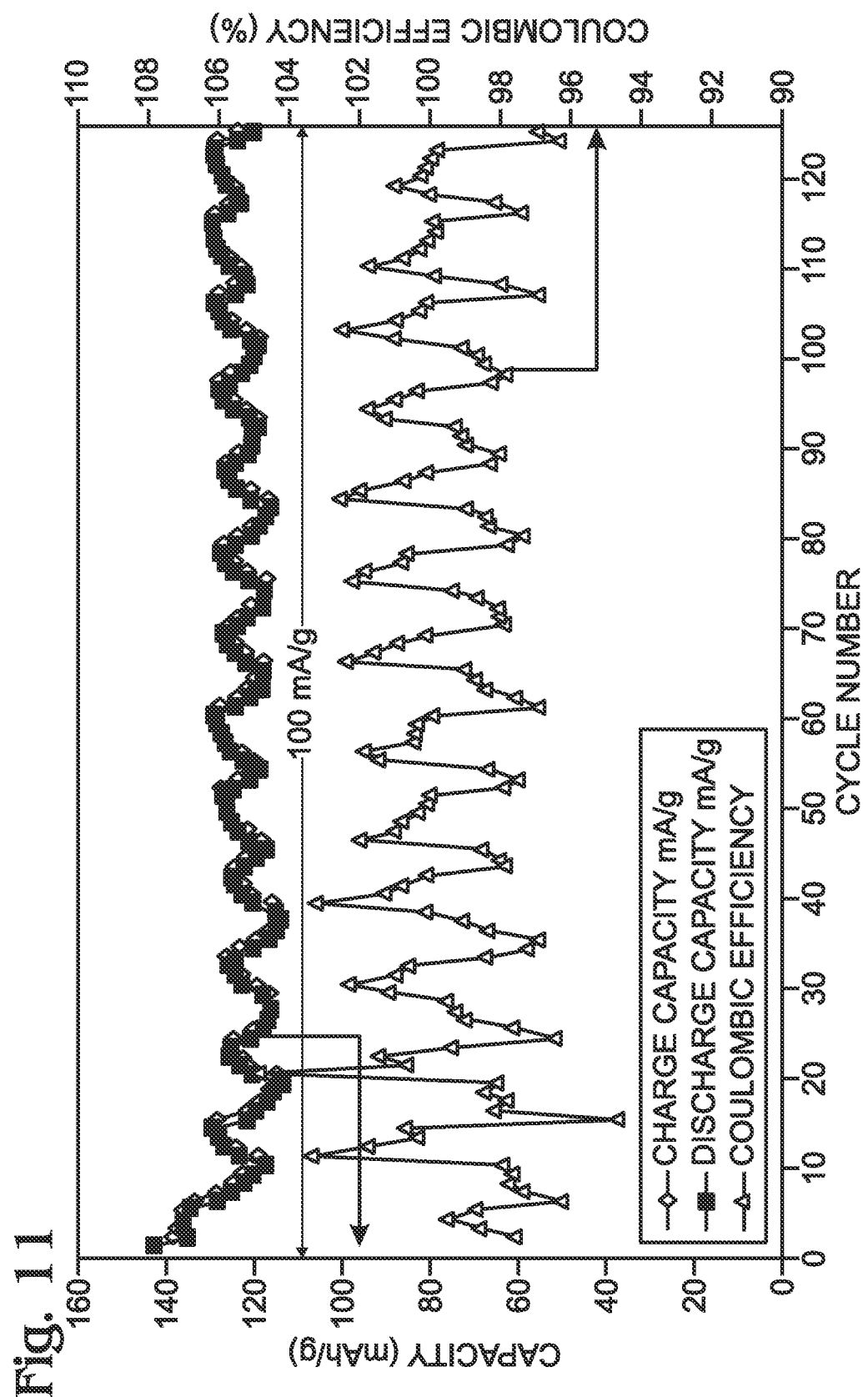
FIG. 11 is a graph depicting the cycling performance of a PBA/Na battery with a PVDF-$KNiFe(CN)_6$ composite membrane reactive layer in a sandwich structured separator.

FIG. 11 is a graph depicting the cycling performance of a PBA/Na battery with a PVDF—$KNiFe(CN)_6$ composite membrane reactive layer in a sandwich structured separator. As another variation of reactive separator, a composite thin film of polyvinylidene fluoride (PVDF) and $KNiFe(CN)_6$ nanoparticles was prepared and used as the reactive layer in the sandwich structured separator. The composite membrane was cast from a homogeneous slurry containing 90% PVDF and 10% $KNiFe(CN)_6$. Such a composite membrane has a more uniform thickness and finer pore size distribution, as compared with the one containing the carbon and PTFE binder (FIG. 10) and, thus, is more efficient in terms of blocking and consuming sodium dendrites with a reduced thickness. After a stabilization process that occurs in the initial 5 cycles, the battery shows no capacity fading in the next 120 cycles.

A reactive separator for a metal-ion battery is provided. Examples of particular materials have been presented to illustrate the invention. However, the invention is not limited to merely these examples. Other variations and embodiments of the invention will occur to those skilled in the art.

We claim:
1. A metal-ion battery with a reactive separator, the battery comprising:
  an anode;
  a cathode;
  a reactive separator comprising:
    a reactive layer, chemically reactive to alkali and alkaline earth metals formed at the anode, having a first side and a second side;
    a first non-reactive layer interposed between the cathode and the reactive layer first side, chemically non-reactive with alkaline and alkaline earth metals;

a second non-reactive layer interposed between the anode and the reactive layer second side, chemically non-reactive with alkali and alkaline earth metals; and, wherein the first and second non-reactive layers are defined as having less than 5 percent by weight (wt %) of materials able to participate in electrochemical reactions with members of the first group.

2. The battery of claim 1 further comprising:
a first passivation layer interposed between the first non-reactive layer and the cathode; and,
a second passivation layer interposed between the second non-reactive layer and the anode.

3. The battery of claim 1 wherein the reactive layer is formed as a material embedded with reactive components, where the material is selected from a group consisting of carbon, porous polymer, a polymer gel.

4. The battery of claim 1 wherein the reactive layer structure includes embedded reactive components selected from a group consisting of benzoquinone, ferrocene derivates, metal ferricyanides, metal ferrocyanides, tetrathiafulvalene derivates, metal hexacyanoferrate, and polyvinylpyrrolidone.

5. The battery of claim 1 wherein the first and second non-reactive layers are a material selected from a group consisting a porous polymer, ceramic membrane, and polymer gel.

6. The battery of claim 1 further comprising:
a liquid electrolyte;
wherein the combination of the first non-reactive layer, reactive layer, and second non-reactive layer is permeable to the liquid electrolyte in a ratio greater than 10 wt % liquid electrolyte as compared to the combined weight of the first non-reactive layer, reactive layer, and second non-reactive layer; and, wherein the reactive separator has an ionic conductivity of greater than $1 \times 10^{-7}$ Siemens per centimeter (S/cm) at 25° C.

7. The battery of claim 1 wherein the reactive layer includes a first material having an electrical conductivity in a range between $1 \times 10^{-14}$ and $1 \times 10^{8}$ S/cm, with reactive components embedded in the first material.

8. The battery of claim 7 wherein the first and second non-reactive layers are made from the first material.

9. The battery of claim 1 further comprising:
a plurality of non-reactive layers greater than two;
a plurality reactive layers; and,
wherein at least one non-reactive layer is adjacent to the anode, and at least one non-reactive layer is adjacent to the cathode.

10. The battery of claim 1 wherein the cathode is a material selected from a group consisting of metal hexacyanometallates (MHCMs), transition metal oxides, transition metal fluorides, and air (oxygen) electrodes; and, wherein the anode is a material selected from a group consisting of lithium (Li), sodium (Na), potassium (K), rubidium (Rb), cesium (Cs), calcium (Ca), strontium (Sr), zinc (Zn), aluminum (Al), magnesium (Mg), zinc (Zn), tin (Sn), germanium (Ge), antimony (Sb), and alloys including a material selected from a group consisting of Sn, Ge, Sb, carbon materials, transition metal oxides, silicon (Si), and phosphorus (P).

11. The battery of claim 1 wherein the reactive layer has an ionic conductivity of greater than $1 \times 10^{-7}$ S/cm at 25° C.; and, wherein the first and second non-reactive layers each have an ionic conductivity of less than $1 \times 10^{-1}$ S/cm.

12. The battery of claim 1 wherein the first and second non-reactive layers each have an electrical conductivity of less than $1 \times 10^{-1}$ S/cm.

\* \* \* \* \*

UNITED STATES PATENT AND TRADEMARK OFFICE
CERTIFICATE OF CORRECTION

PATENT NO. : 9,634,317 B2
APPLICATION NO. : 14/230882
DATED : April 25, 2017
INVENTOR(S) : Wang et al.

Page 1 of 1

It is certified that error appears in the above-identified patent and that said Letters Patent is hereby corrected as shown below:

In Column 8, Line 67, Claim 1 - the word "alkaline" (first occurrence) should be corrected to read "alkali".

In Column 9, Line 8, Claim 1 - the phrase "members of the first group" should be corrected to read "alkali and alkaline earth metals".

Signed and Sealed this
Seventeenth Day of April, 2018

Andrei Iancu
*Director of the United States Patent and Trademark Office*